Feb. 9, 1943.  W. F. HELLER  2,310,525
SECTIONAL DIE
Filed Nov. 14, 1939  3 Sheets-Sheet 3

INVENTOR
*William F. Heller*

Patented Feb. 9, 1943

2,310,525

UNITED STATES PATENT OFFICE 2,310,525

SECTIONAL DIE

William F. Heller, Norwood, Ohio, assignor to Ashley F. Ward, Cincinnati, Ohio

Application November 14, 1939, Serial No. 304,318

2 Claims. (Cl. 153—22)

This invention relates to a sectional die for use in the die-forming of sheet material. While the die has many other applications, it is of especial usefulness in the formation of containers, such, for example, as baking pans, out of sheet metal. The die shown in the drawings and which will be described for purposes of explanation and illustration is designed for the formation of baking pans out of full hard cold rolled aluminum, such a baking pan and the method of making the same being disclosed in the copending application of Ashley F. Ward, Serial No. 254,016, filed February 1, 1939.

Baking pans for the baking of loaves of bread are in demand in various sizes, although such pans are as a rule of rectangular shape and of uniform taper. Pans of the type disclosed in the above mentioned application of Ashley F. Ward are formed by bending an initially flat blank of aluminum, this preferably being accomplished by disposing the blank on top of a female die and then lowering a punch or male die under pressure into the female die to bend the blank into pan shape. The cost of the female dies is very great and heretofore it has been necessary to cast and machine an entire new female die for each different size or shape of pan to be formed. Of course a male die corresponding in size and shape to the female die is also required, but the cost of the male die or punch is comparatively small, so it is feasible to make a new male die for each different size or shape of pan to be formed. However, the great cost of casting and machining a new female die for each different size or shape of pan to be formed results in excessive cost of the pans.

I have devised a sectional die which may be employed for making articles such as baking pans of different transverse dimensions. My sectional die is made up of separate die sections or members which are adapted to be assembled to form female dies of various lengths and widths. The sectional die herein disclosed for purposes of illustration is adapted for the formation of generally rectangular baking pans of uniform depth and taper, but by suitable selection and arrangement of the die sections the length and width of the die, and hence of the pan formed therein, may be varied as desired. For use in forming pans of different depths different sets of die sections corresponding in depth to the depth of pan desired would be employed, and the same would be true in the formation of pans of different angles of taper.

My sectional die has a considerable number of features which so far as I am aware are novel and which contribute individually and cooperatively to the making of a relatively inexpensive yet highly useful sectional die. Such features and other details, objects and advantages of the invention will be explained or will become apparent as the following description of a present preferred embodiment of the invention proceeds.

In the accompanying drawings I have shown a present preferred embodiment of the invention, in which Figure 1 is a plan view of a sectional die;

Figure 1:
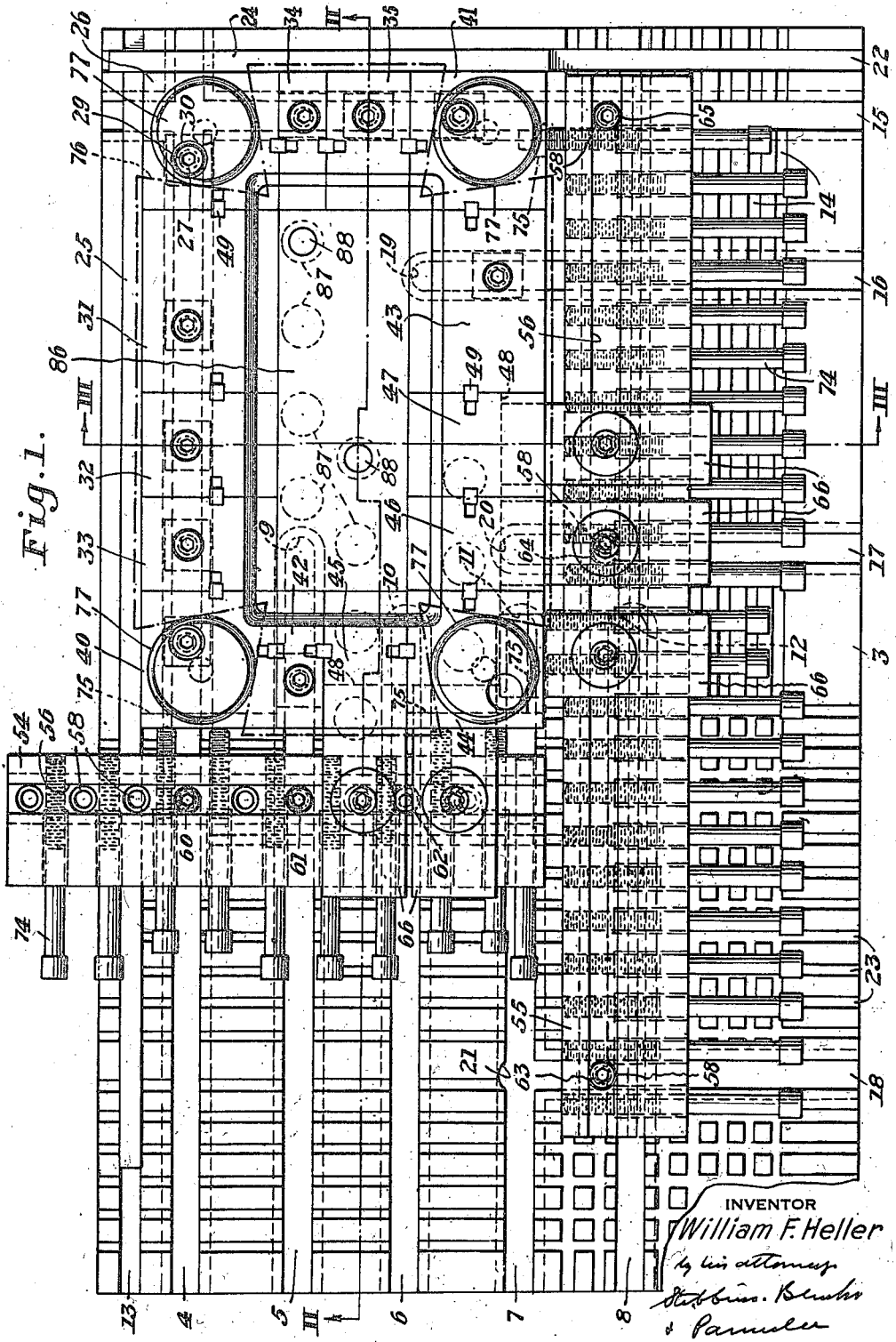
Figure 3:
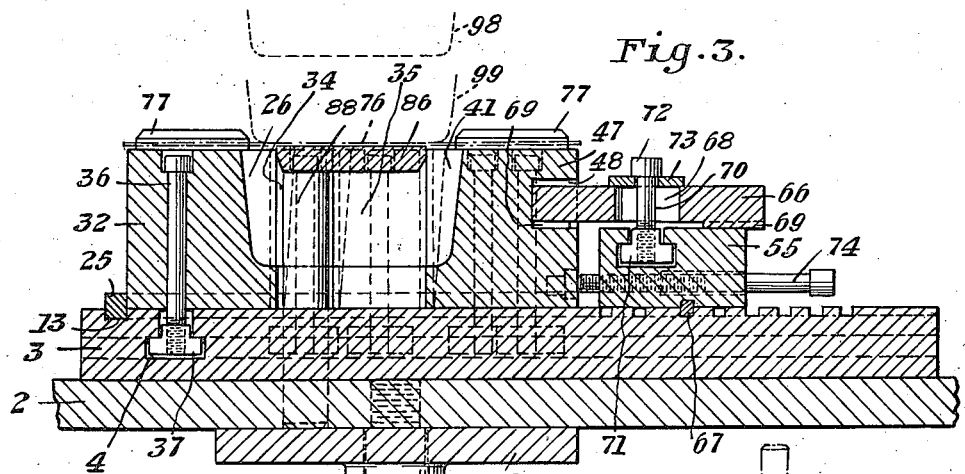
Figure 3 is a vertical transverse cross-sectional view taken on the line III—III of Figure 1.

Referring now more particularly to the drawings, there is provided a bed or table 2 which may be suitably supported and upon which the sectional die is mounted. The sectional die has a base 3 which lies upon the table 2 and is preferably fastened thereto as by bolts (not shown). The upper face of the base 3 has five longitudinal T slots 4, 5, 6, 7 and 8, respectively, each of such slots having the cross-sectional shape of the slot 4 as shown in Figure 3. The slot 4 extends the full length of the base. Each of the slots, 5, 6, 7 and 8 extends less than the full length of the base from the left-hand edge thereof viewing Figure 1, these slots terminating at the points 9, 10, 11 and 12, respectively. Also extending longitudinally of the base throughout the full length thereof adjacent the upper edge of the base viewing Figure 1 is a relatively wide rectangular slot 13. Also extending longitudinally of the base throughout the full length thereof at the lower portion of the base viewing Figure 1 are eight relatively narrow rectangular slots 14. The third of such slots 14 counting from the top in Figure 1 coincides with the T slot 8 to the left of the point 12.

Figure 2:
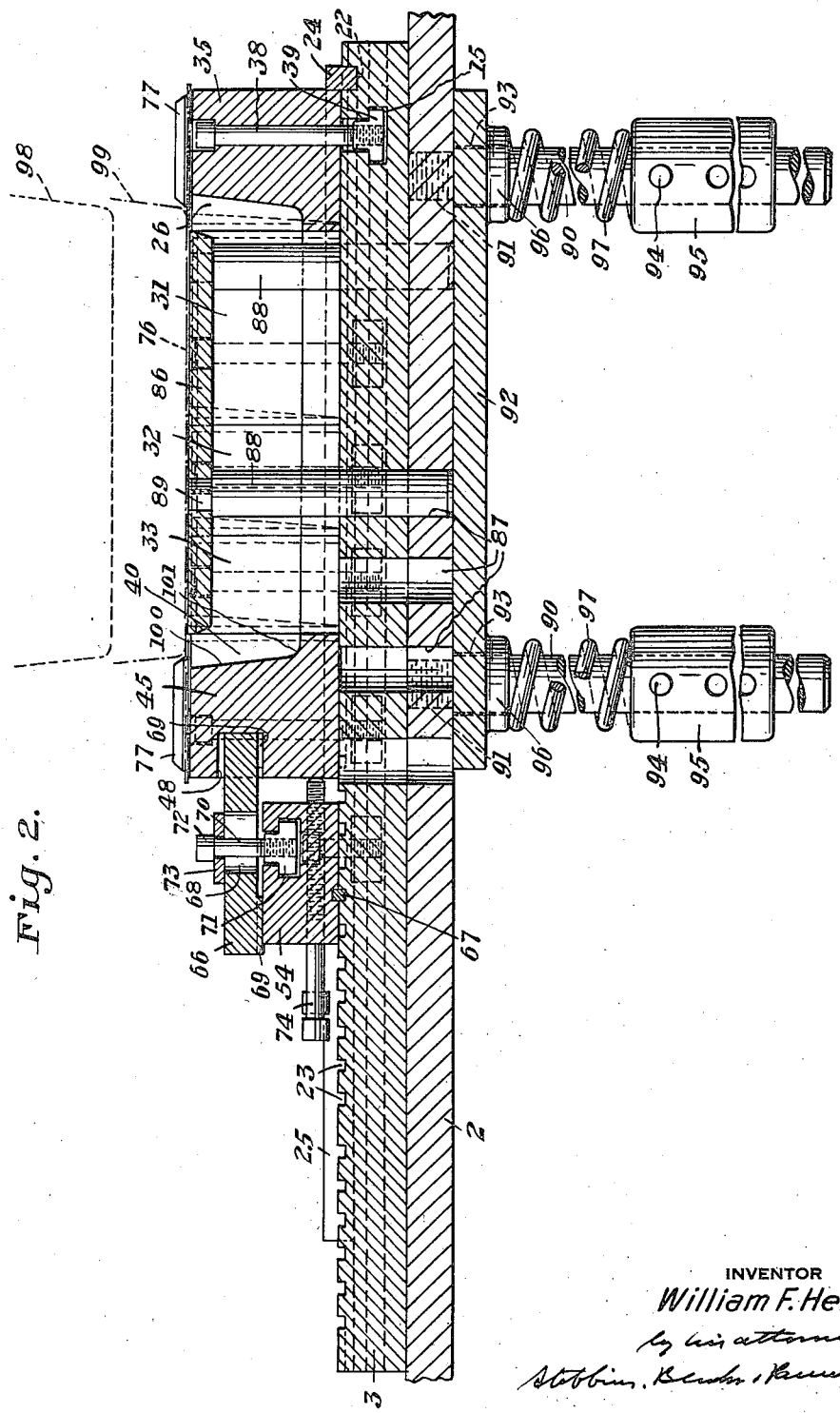
Figure 2 is a vertical longitudinal cross-sectional view taken on the line II—II of Figure 1.

The upper face of the base 3 has four transverse T slots 15, 16, 17 and 18, respectively, each of such slots having the cross-sectional shape of the slot 15 as shown in Figure 2, which is the same as the cross-sectional shape of the longitudinal T slots above described. The slot 15 extends the full width of the base. Each of the slots 16, 17 and 18 extends less than the full width of the base from the lower edge thereof viewing Figure 1, these slots terminating at the points 19, 20 and 21, respectively. Also extending transversely of the base throughout the full width thereof adjacent the right-hand edge of the base viewing Figure 1 is a relatively wide rectangular slot 22 of the same size as the longitudinal slot 13. Also extending transversely of the base throughout the full width thereof at the left-hand portion of the base viewing Figure 1 are seventeen relatively narrow rectangular slots 23 of the same size as the longitudinal slots 14. The sixth of such slots 23 counting from the left in Figure 1 coincides with the T slot 18 below the point 21.

A stop or abutment bar 24 fits tightly within the slot 22 with a substantial portion thereof projecting above the slot as shown in Figure 2. A stop or abutment bar 25 fits tightly within the slot 13 with a substantial portion thereof projecting above the slot as shown in Figure 3. These bars 24 and 25 serve to align the die sections along two adjacent edges of the die, namely, those edges which are at the top and at the right-hand end viewing Figure 1. There is provided a fixed corner member or die section 26 whose upper and right-hand edges viewing Figure 1 lie against and are aligned and positioned by the bars 25 and 24, respectively. Moreover, the corner member 26 is positively held down in position on the base by a bolt 27 with which cooperates a nut 28 which is of generally T shape in transverse cross-section and generally rectangular in horizontal cross-section. The shape of the nut 28 in a horizontal plane is shown by dotted lines in Figure 1 and its shape in transverse cross-section is the same as that of the nut 39 shown in Figure 2. The bolt 27 has an enlarged head 29 which enters an enlarged bore 30 in the top of the corner member 26, the shank of the bolt 27 entering a somewhat smaller bore in the corner member below the enlarged bore 30. Consequently by tightening the bolt 27 into the nut 28 the corner member 26 is fastened securely to the base 3. Before tightening the bolt the corner member should be accurately positioned in contact with the bars 24 and 25 and with its faces in alignment therewith.

The corner member 26 is always employed regardless of the length or width of the pan to be formed and it is always positioned and fastened in place as above described. The length and width of the die are determined by the number and/or size of the side sections thereof adjoining the corner member 26. I find it preferable to provide side sections of different lengths in the direction of the side of the die in which they are positioned as this enables the formation of dies of different lengths and widths with fewer side sections. If desired, however, the side sections may be made in units of uniform size, but in such case the units should be comparatively short to allow for flexibility of die size.

In the form of die shown in the drawings three side sections 31, 32 and 33 are positioned adjacent the corner member 26 and extend parallel to the longer dimension of the die, while two side sections 34 and 35 are positioned adjacent the corner member 26 and extend parallel to the shorter dimension of the die. As will be seen, these side sections are of various lengths along the respective sides of the die and by suitable selection of side sections a die of any length and width may be formed.

Each of the side sections 31, 32 and 33 lies against and in alignment with the abutment bar 25 and is bolted to the base by means of the T slot 4 precisely as above explained with respect to the corner member 26. In Figure 3 the section 32 is shown as being bolted to the base 3 by a bolt 36 cooperating with a T-shaped nut 37 lying within the T slot 4. The bolts and T-shaped nuts for bolting the die sections to the base through the respective T slots are of uniform construction and the above description and the showing of the drawings applies to all of them.

Each of the side sections 34 and 35 lies against and in alignment with the abutment bar 24 and is bolted to the base by means of the T slot 15. In Figure 2 the section 35 is shown as being bolted to the base 3 by a bolt 38 cooperating with a T-shaped nut 39 lying within the T slot 15.

Corner members 40 and 41 lie next to the side sections 33 and 35, respectively. The corner member 40 is aligned by the abutment bar 25 and is bolted to the base through the T slot 4 and the corner member 41 is aligned by the abutment bar 24 and is bolted to the base through the T slot 15. It will be noted that each of the corner members 40 and 41 is adjustable in a direction parallel to the length of the side of the die joining it with the corner bar 26 but not transversely thereof.

A side section 42 lies next to the corner member 40 and is bolted to the base through the T slot 5. A side section 43 lies next to the corner member 41 and is bolted to the base through the T slot 16. All of the corner and side members heretofore described are, as has been seen, bolted directly to the base. This is feasible as to all of the members 41, 35, 34, 26, 31, 32, 33 and 40 inasmuch as each of them lies above at least one of the T slots 15 and 4 and hence can easily be bolted to the base through one of such T slots. Moreover, as the die will always have an appreciable length and width it is feasible to provide for bolting directly to the base the side sections 42 and 43 which lie next the corner members 40 and 41, respectively, and to this end the respective T slots 5 and 16 are provided. There will always be at least one side section intermediate corner members at each side of the die and therefor there will always be a side section above each of the T slots 5 and 16 which can be bolted thereto.

The die is completed by a corner member 44, a side section 45 between the corner member 44 and the side section 42 and side sections 46 and 47 between the corner member 44 and the side section 43. The corner member 44 and the side sections 45, 46 and 47 are connected with the base 3 indirectly, as will presently be described. Each of such members or sections has in its outer face (its two outer faces in the case of the corner member 44) a recess 48 for the reception of a holddown, as will presently be described.

Figure 4:
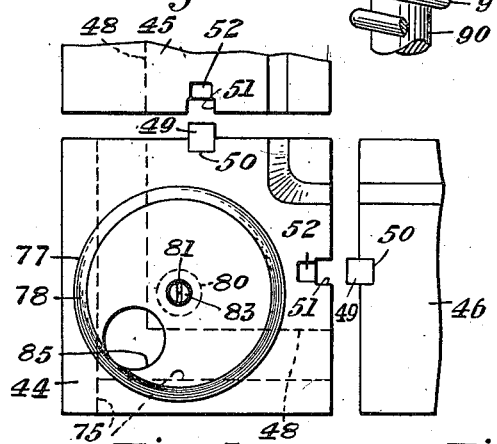
Figure 4 is a fragmentary top plan view to enlarged scale of sections of my sectional die at and adjacent one corner thereof, the sections being shown slightly separated for clarity of disclosure of their structure.
Figure 7:
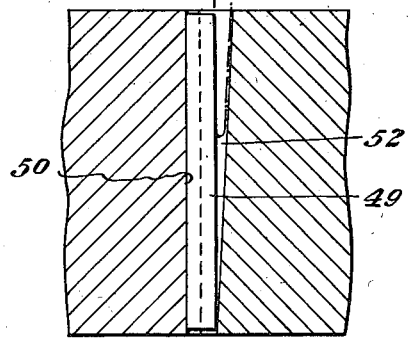
Figure 7 is a fragmentary vertical cross-sectional view at the juncture of two of the die members or sections illustrating how they may easily be separated.
Figure 5:
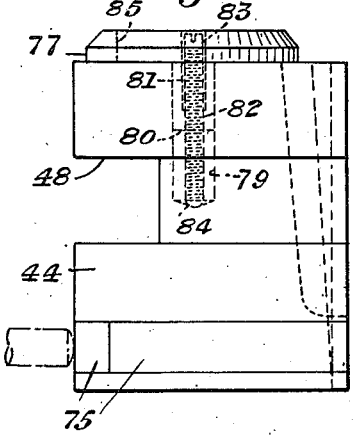
Figure 5 is an elevational view of the corner member or section of the die shown in Figure 4 as viewed from below in that figure.
Figure 6:
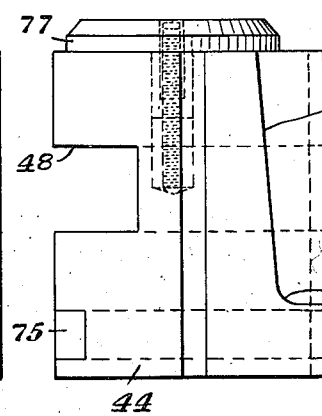
Figure 6 is an elevational view of the corner member or section of the die shown in Figures 4 and 5 as viewed from the right in said figures.

Each of the side sections and corner members of the die has a key 49 permanently connected therewith at one side as by being driven into a slot 50 therein. At its other side at which it abuts another side section or corner member each of the side sections and corner members has a key slot 51 of such size as to snugly receive the projecting portion of the key 50 of the adjacent section, and when the die sections are assembled they are positioned directly in contact with one another so as to be keyed together whereby they are held against relative transverse movement. In Figure 4 the corner member 44 and fragments of the side sections 45 and 46 are shown separated for the purpose of making clear the key structure. Behind each key slot 51 is a narrower slot 52 which tapers from maximum transverse depth at the top of the section to minimum transverse depth at the bottom of the section and into which a wedge 53 (Figure 7) is adapted to be driven to separate the adjacent sections upon disassembly of the die. Provision is thus made for locking the die sections against relative movement transversely of the respective sides of the die in which they lie, yet enabling easy disassembly of the die.

Figure 8:
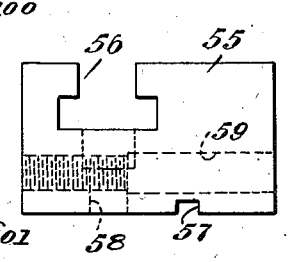
Figure 8 is an end view of one of the clamp bars of my sectional die.

There are provided a pair of clamp bars 54 and 55, the former being adapted to cooperate with the side sections and corner members at the left-hand edge of the die viewing Figure 1, and the latter being adapted to cooperate with the side sections and corner members at the lower edge of the die viewing such figure. These bars are of similar construction, Figure 8 showing the bar 55 as viewed from its left-hand edge in Figure 1. The bar 54 would look the same when viewed from the top of Figure 1. Each of the bars has in its upper surface a T slot 56 extending longitudinally thereof from end to end and in its lower surface a key slot 57 also extending longitudinally thereof from end to end and of the same width as each of the slots 14 and 23. Each bar also has a number of vertical clamping bolt receiving holes 58 bored therein, there being nine such holes in the bar 54 and three such holes in the bar 55. Each of the bars 54 and 55 also has a series of transverse clamping bolt receiving openings 59, each of which is slightly enlarged at one end and threaded at the other end as shown in Figure 8.

The clamp bar 54 is bolted directly to the base 3 by bolts 60, 61 and 62 passing through three of the holes 58 which are aligned with the T slots 4, 5 and 6, respectively. The same sort of bolts and T-shaped nuts are used for fastening the clamp bars to the base as are used for fastening to the base those die sections which are bolted thereto. The position of the clamp bar 54 is adjusted up or down viewing Figure 1 depending upon the dimension of the die parallel to the length of such bar and so that the lower end of the bar viewing Figure 1 is substantially in alignment with the lower outside face of the die. The spacing between the holes 58 in the bar 54 is just half the spacing between the T slots 4, 5, 6, 7 and 8 so that some or all of such slots may be used for clamping the bar 54 to the base depending upon the position of the bar. The bar is positioned slightly spaced to the left of the outside of the left-hand face of the die as shown in Figure 1.

Bolts 63, 64 and 65 with which cooperate T-shaped nuts as above described pass through the three holes 58 in the bar 55 and also within the respective T slots 18, 17 and 15 whereby the bar 55 is fastened to the base. The bar 55 is positioned slightly below the lower outside face of the die viewing Figure 1. The exact position and correct alignment of each of the clamp bars 54 and 55 is determined by a key 67 entering one of the key slots 14 or 23 in the base, as the case may be, and also entering the key slot 57 in the bottom of the clamp bar. Each clamp bar after being so fixed in position with respect to the base is bolted to the base as above described. The keys 67 not only insure correct alignment of the clamp bars but also serve to at least partially resist the side thrust of the clamping screws, as will presently be described.

The clamp bars 54 and 55 carry holddowns 66, two of such holddowns being shown in Figure 1 on the clamp bar 54 and three on the clamp bar 55. Each holddown consists of an elongated block of steel having a horizontally elongated vertically extending central opening 68 therein and also having adjacent its ends slightly downwardly extending feet 69, as shown in Figures 2 and 3. One end of each of the holddowns 66 enters the recess 48 of one of the recessed die members 44, 45, 46 and 47, as shown, and is clamped down by a bolt 70 and a T-shaped nut 71, the bolt having an enlarged head 72 and carrying a washer 73. Each holddown 66 is adjusted toward the die until its inner end engages the vertical face of the die at the inner extremity of the recess 48 in the die section with which it cooperates, as shown in Figures 2 and 3, whereupon it is clamped down tightly by the bolt 70. Thus the die sections 44, 45, 46 and 47 are held down against the base through the clamp bars 54 and 55 and the holddowns 66.

The clamp bar 54 has ten clamping bolt receiving openings 59 and the clamp bar 55 has twenty-three such openings and a clamping bolt 74 is disposed in each of such openings and threaded through the threaded portion thereof, as shown in the drawings. In the structure shown only those clamping bolts which are opposite the corner members 40, 41 and 44 are utilized, the remaining clamping bolts being inoperative. Those clamping bolts which are opposite the corner members 40, 41 and 44 are turned up so as to engage such corner members, thereby pressing them toward the opposed abutment bar 24 or 25, as the case may be, and further insuring maintenance of the integrity of the die. The corner members 40, 41 and 44 have inserts 75 of hardened steel against which the clamping bolts are adapted to bear.

By reason of the use of the clamping bolts 74 all four sides of the die are placed under compression longitudinally thereof between the respective clamping bolts and the respective opposed abutment bars. The die sections 44, 45, 46 and 47 are held down by the holddowns 66 and the remaining die sections are bolted directly to the base. All of the die sections are keyed to hold them against inward or outward movement. Yet, as will be apparent from the above description, the structure is extremely flexible and it is a very simple matter to change it to alter the length or width of the die, or both.

The clamping bolts 74 which lie opposite the side die sections 42, 45, 46, 47 and 43 are, as above stated and as shown in the drawings, inoperative. However, it may be desirable to turn up these clamping bolts to engage the side sections, and particularly the side sections 45, 46 and 47 which are not bolted directly to the base 3. However, normally such use will not be necessary and such clamping bolts will simply remain inoperative.

A generally rectangular blank with cut out corners, as indicated by the chain lines 76 in Figures 1, 2 and 3, is preferably employed for use in my improved die for making baking pans.

Such a blank and a baking pan made therefrom are disclosed in the above mentioned application of Ashley F. Ward. For properly positioning the flat blank on the die prior to the forming operation I provide at the top of each of the corner members of the die a circular positioning button 77, the upper portion of the edge of which is beveled as shown at 78. Each of the corner members has a bore 79 within the upper portion of which fits a hollow pin 80 formed integrally with the button 77. The pin 80 has a bore extending therethrough from top to bottom, which bore also extends upwardly through the button 77. The upper portion 81 of such bore is relatively enlarged and the lower portion 82 is of slightly smaller diameter and is internally threaded. A headless threaded pin 83 enters the bore 81 and is threaded within the hollow pin 80 at 82. The threaded pin 83 is of such length that its lower end 84 rests against the bottom of the bore 79 in the corner member. The upper end of the threaded pin 83 is shaped to receive a screw driver or a wrench so that it may be turned. When the threaded pin 83 is turned the positioning button 77, which will not be turned, will be elevated by such threaded pin, the bottom of which bears against the bottom of the bore 79. Thus is provided a simple way of removing the positioning buttons 77 when desired, as, for example, when die sections of a different height are to be employed. Each of the positioning buttons 77 has a bore 85 therethrough to permit access to the bolt through which the corner member is fastened down to the base. Consequently, the bore 85 in the positioning button carried by the corner member 44 has no function, as such corner member is not bolted down directly to the base. However, for sake of uniformity all of the positioning buttons 77 are made the same.

There is provided a stripper plate 86 which when in its lowermost position forms the bottom of the die, but which is mounted for vertical movement to assist in clamping the initial flat blank against the punch when the latter moves downwardly into the die and also to eject the formed pan blank. The base 3 and the bed or table 2 are provided with series of bores 87 therethrough for the reception of pins 88, each of which has a reduced upper extremity 89 entering an opening provided in the stripper plate 86. The series of bores 87 are provided so that when the die is made up in various different sizes and shapes, the pins on the stripper plate used therewith will pass through appropriate bores. A different stripper plate is used for each size and shape of die.

Two pins 90 each have a reduced upper extremity 91 threaded into a hole provided therefor in the table 2. There is provided a back-up plate 92 below the table which has bores 93 for loosely receiving the respective pins 90. Fastened to each pin 90 by a cross pin 94 is a stop member or collar 95. The position of the stop member or collar 95 on the pin 90 can be adjusted as desired, as each of the collar and pin has a plurality of holes for reception of the cross pin 94. Bearing between the collar 95 and the boss 96 on the plate 92 is a coil spring 97. The coil springs 97 normally hold the back-up plate 92 against the bottom of the table 2. The pins 88 are of such length that when the back-up plate 92 lies against the bottom of the table 2 with the bottoms of the pins 88 resting against the top of the back-up plate the stripper plate 86 is elevated to a position substantially in horizontal alignment with the top of the die, as shown in Figures 2 and 3. With the stripper plate in this position the flat generally rectangular blank with its corners cut out is laid over the die with the positioning buttons 77 fitting within the cutout corners of the blank to hold it against horizontal shifting. The punch designated diagrammatically by the dotted line 98 in Figures 2 and 3 is then lowered under pressure and immediately clamps the flat blank between its lower surface and the top of the stripper plate 86. At such time the punch is in the position indicated by the chain lines 99 in Figures 2 and 3. The punch then moves downwardly within the die, forming the flat blank into a pan shaped blank. When the stripper plate 86 reaches the bottom of the die it comes to rest against the top of the base 3 and can move no farther. Downward movement of the stripper plate is permitted by the springs 97. When the punch is raised the stripper plate 86 follows it by reason of the action of the springs 97 and raises and ejects the pan shaped blank which has been formed in the die.

Each of the die sections has a downwardly and inwardly inclined inner die face 100 and a rounded lower corner 101. While the stripper plate 86 in the form shown forms substantially the entire bottom of the die, this is not essential and the stripper plate may be made somewhat smaller while still performing its function.

While I have shown and described a present preferred embodiment of the invention, it is to be distinctly understood that the same is not limited thereto but may be otherwise variously embodied within the scope of the following claims.

I claim:

1. A sectional die comprising a base, cooperating die sections arranged on said base, an elongated holddown supporting member connected with the base and holddown means carried by said supporting member and adjustable longitudinally thereof and having projecting portions engaging the die sections to maintain the same in place relatively to the base.

2. A sectional die comprising a base, a group of aligned die sections arranged on said base, stop means connected with said base and bearing against one end of said group of aligned die sections, and screw means adapted to be fastened down to said base at desired adjusted positions thereon and adapted to be turned up so as to bear against the opposite end of said group of aligned die sections.

WILLIAM F. HELLER.